United States Patent
Ehara

(10) Patent No.: US 12,065,057 B2
(45) Date of Patent: Aug. 20, 2024

(54) CONTROL DEVICE FOR ESTIMATING POSSIBILITY OF PARTICIPATION OF VEHICLE IN VIRTUAL POWER PLANT

(71) Applicant: TOYOTA JIDOSHA KABUSHIKI KAISHA, Toyota (JP)

(72) Inventor: Masato Ehara, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 566 days.

(21) Appl. No.: 17/226,622

(22) Filed: Apr. 9, 2021

(65) Prior Publication Data

US 2021/0370791 A1    Dec. 2, 2021

(30) Foreign Application Priority Data

Jun. 1, 2020  (JP) ................. 2020-095515

(51) Int. Cl.
| | | |
|---|---|---|
| *B60L 55/00* | (2019.01) | |
| *B60L 53/63* | (2019.01) | |
| *B60L 53/67* | (2019.01) | |
| *B60L 53/68* | (2019.01) | |
| *B60L 58/12* | (2019.01) | |
| *G05B 15/02* | (2006.01) | |
| *H02J 3/28* | (2006.01) | |

(52) U.S. Cl.
CPC ............... *B60L 55/00* (2019.02); *B60L 53/63* (2019.02); *B60L 53/67* (2019.02); *B60L 53/68* (2019.02); *B60L 58/12* (2019.02); *G05B 15/02* (2013.01); *H02J 3/28* (2013.01)

(58) Field of Classification Search
CPC .......... B60L 55/00; B60L 53/63; B60L 53/64; B60L 53/665; B60L 53/67; B60L 53/68; B60L 58/12; G05B 15/02; H02J 3/28; B60W 2510/244
USPC ........................................................ 320/109
See application file for complete search history.

(56) References Cited

U.S. PATENT DOCUMENTS

| | | | |
|---|---|---|---|
| 10,800,413 B2 | 10/2020 | Rajendran et al. | |
| 11,075,528 B2 | 7/2021 | Kitaoka et al. | |
| 2018/0123391 A1* | 5/2018 | Lakamp | H02J 13/00028 |
| 2020/0369175 A1* | 11/2020 | Rajabally | B60L 53/62 |
| 2023/0127845 A1* | 4/2023 | Guo | H02J 7/0048 |
| | | | 705/412 |

(Continued)

FOREIGN PATENT DOCUMENTS

| | | | |
|---|---|---|---|
| CN | 110979084 A * | 4/2020 | .............. B60L 53/63 |
| JP | 2018-102047 A | 6/2018 | |

(Continued)

*Primary Examiner* — Richard Isla
*Assistant Examiner* — Manuel Hernandez
(74) *Attorney, Agent, or Firm* — Oliff PLC

(57) ABSTRACT

A control device for a virtual power plant that adjusts balance between supply and demand of electric power in a transmission and distribution network by controlling charging and discharging operations of storage batteries mounted on vehicles, includes: an estimation unit configured to estimate, based on past action patterns of the vehicles, possibilities of participation of the vehicles in the virtual power plant when a charging and discharging operation is requested; and a control unit configured to control charging and discharging operations of the storage batteries mounted on the vehicles based on the estimation result of the estimation unit.

3 Claims, 5 Drawing Sheets

(56) References Cited

U.S. PATENT DOCUMENTS

| | | | |
|---|---|---|---|
| 2023/0196090 A1* | 6/2023 | Chaykowsky | G06N 3/08 |
| | | | 706/12 |
| 2024/0059170 A1* | 2/2024 | Khamis | B60L 58/16 |

FOREIGN PATENT DOCUMENTS

| | | | | | |
|---|---|---|---|---|---|
| JP | 2018-137886 | A | | 8/2018 | |
| JP | 2019-91433 | A | | 6/2019 | |
| JP | 2021191133 | A | * | 12/2021 | B60L 53/64 |
| KR | 102040027 | B1 | * | 11/2019 | |
| WO | WO-2020110698 | A1 | * | 6/2020 | B60L 53/12 |

* cited by examiner

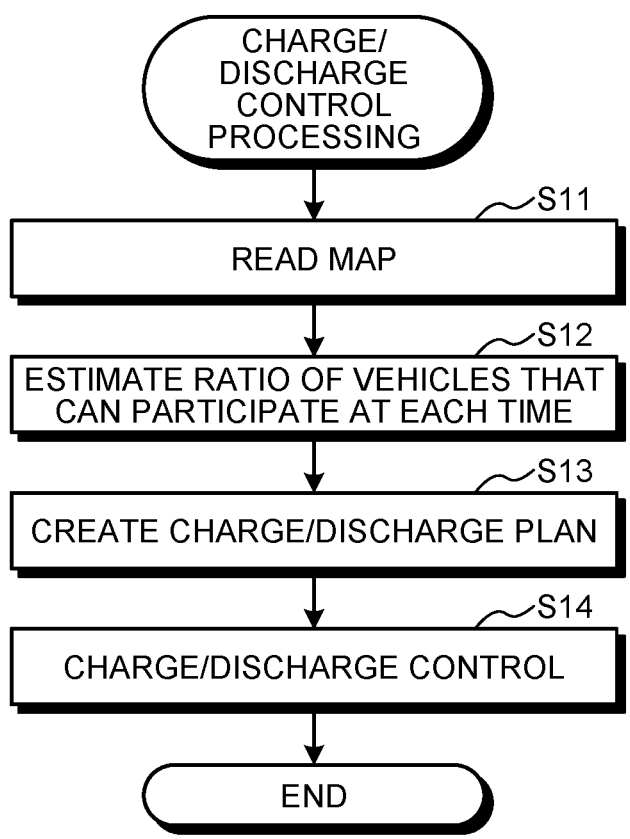

CONTROL DEVICE FOR ESTIMATING POSSIBILITY OF PARTICIPATION OF VEHICLE IN VIRTUAL POWER PLANT

CROSS-REFERENCE TO RELATED APPLICATION(S)

The present application claims priority to and incorporates by reference the entire contents of Japanese Patent Application No. 2020-095515 filed in Japan on Jun. 1, 2020.

BACKGROUND

The present disclosure relates to a control device for a virtual power plant.

Japanese Laid-open Patent Publication No. 2019-91433 discloses a method of estimating a traveling route and a charging location of an electric vehicle based on the past traveling history and charging history of an electric vehicle, and warning the driver to connect a charging plug to the electric vehicle based on the estimation result.

SUMMARY

There is a need for providing a control device for a virtual power plant capable of appropriately controlling the charging and discharging operations of all of vehicle groups included in the virtual power plant according to the states of vehicles.

According to an embodiment, a control device for a virtual power plant that adjusts balance between supply and demand of electric power in a transmission and distribution network by controlling charging and discharging operations of storage batteries mounted on vehicles, includes: an estimation unit configured to estimate, based on past action patterns of the vehicles, possibilities of participation of the vehicles in the virtual power plant when a charging and discharging operation is requested; and a control unit configured to control charging and discharging operations of the storage batteries mounted on the vehicles based on the estimation result of the estimation unit.

BRIEF DESCRIPTION OF THE DRAWINGS

FIG. 6 is a flowchart illustrating a flow of charge/discharge control processing according to an embodiment of the present disclosure.

DETAILED DESCRIPTION

In recent years, the development of a virtual power plant (VPP) that adjusts the balance between supply and demand of electric power in a distribution network by controlling the charging and discharging operation of a battery mounted on a vehicle such as an electric vehicle has been advanced. In order to properly operate this virtual power plant, it is necessary to appropriately control the charging and discharging operations of all of the vehicle groups included in the virtual power plant. For this reason, it has been expected to provide a technique capable of appropriately controlling the charging and discharging operations of all of vehicle groups included in the virtual power plant according to the states of vehicles.

Hereinafter, a virtual power plant according to an embodiment of the present disclosure will be described in detail with reference to the drawings.

Configuration

First, a virtual power plant according to an embodiment of the present disclosure will be described in detail with reference to FIG. 1.

Figure 1:
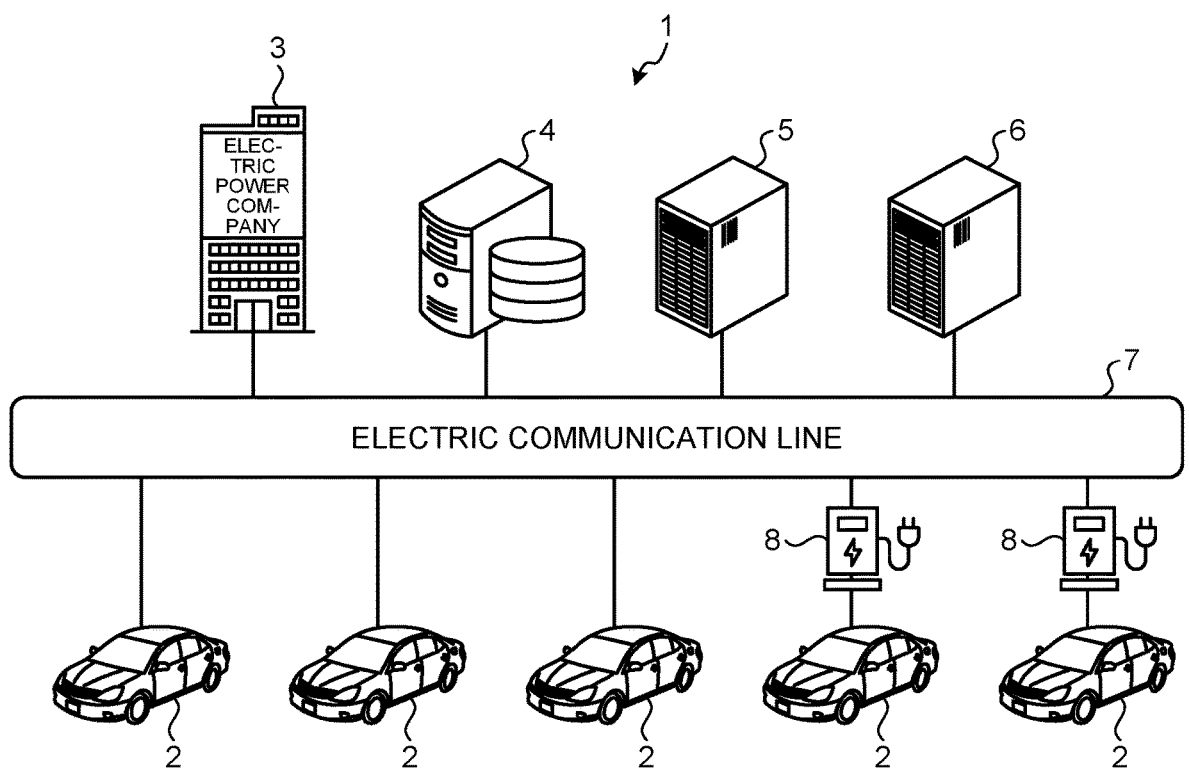
FIG. 1 is a schematic diagram illustrating a configuration of a virtual power plant according to an embodiment of the present disclosure.

FIG. 1 is a schematic diagram illustrating a configuration of a virtual power plant according to an embodiment of the present disclosure. As illustrated in FIG. 1, a virtual power plant 1 according to an embodiment of the present disclosure is a system that adjusts the balance between supply and demand of electric power in a transmission and distribution network by controlling the charging and discharging operations of a batteries mounted on vehicle 2. In the present embodiment, the virtual power plant 1 includes a plurality of vehicles 2, an electric power company 3, a database server 4, a data processing server 5, and a control server 6 as main components, and the components are configured to be able to communicate with each other via an electric communication line 7 such as the Internet line, a power line, or the like.

Each of the vehicles 2 includes a vehicle such as a hybrid vehicle (HV), an electric vehicle (EV), and a fuel cell electric vehicle (FCEV). The vehicle 2 includes a battery that can be charged and discharged via the transmission and distribution network, and is configured to be able to transmit various types of vehicle data via the electric communication line 7. Vehicle data includes an identification number of the vehicle 2 (VIN number, etc.), vehicle data acquisition date and time, information that enables determination of the on/off state of the ignition switch (trip counter, etc.), and position information of the vehicle 2 (an identification number of a charging stand 8, longitude/latitude information of global positioning system (GPS) of the vehicle 2), a travel distance (odometer, etc.), a state of charge (SOC) of the battery, and the like are included. When the vehicle 2 is connected to the charging stand 8 for charging the battery, the vehicle 2 may be connected to the electric communication line 7 via the charging stand 8 to transmit vehicle data.

The electric power company 3 supplies the power generated at well-known power plants such as hydroelectric power plants, thermal power plants, and nuclear power plants to consumers and consumer facilities via the transmission and distribution network, and also purchases surplus power supplied by consumers and consumer facilities.

The database server 4 includes a well-known information processing device such as a workstation, and includes a database to/from which electronic information can be written and read via the electric communication line 7. In the database, vehicle data acquired from the vehicle 2 via the
} electric communication line 7 at any timing such as a predetermined control period is stored.

The data processing server 5 includes a well-known information processing device such as a workstation. The data processing server 5 creates an action pattern model for estimating the action pattern of the vehicle 2 for each vehicle group by performing action pattern model creation processing to be described below.

The control server 6 includes a well-known information processing device such as a workstation. The control server 6 estimates the action patterns of the plurality of vehicles 2 using the action pattern model created by the data processing server 5 and controls the charging and discharging operations of the plurality of vehicles 2 based on the estimation result by performing the charge/discharge control processing to be described below. The control server 6 functions as an estimation unit and a control unit according to the present disclosure.

The virtual power plant 1 having such a configuration performs the action pattern model creation processing and charge/discharge control processing to be described below to control the charging and discharging operation appropriately according to the vehicle 2, and thus all of the vehicle groups included in the virtual power plant 1. The operation of the virtual power plant 1 when performing the action pattern model creation processing and the charge/discharge control processing will be described below.

Action Pattern Model Creation Processing

Figure 2:
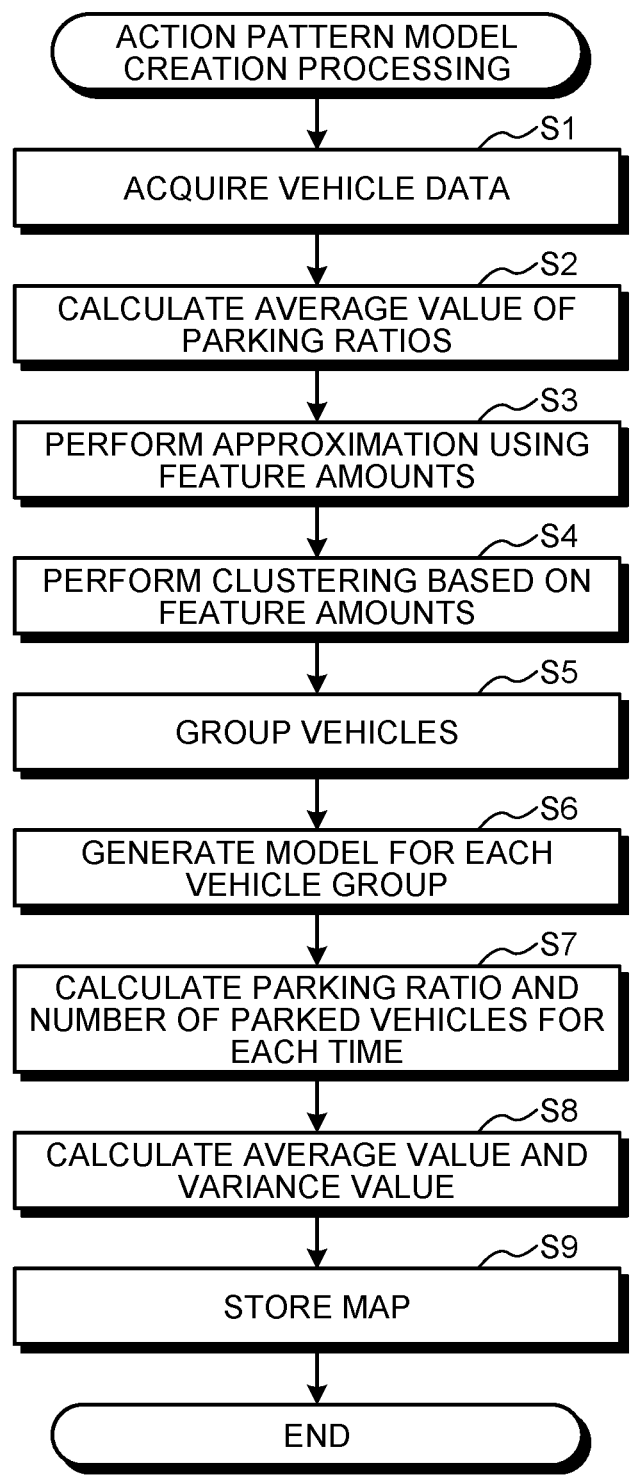
FIG. 2 is a flowchart illustrating a flow of action pattern model creation processing according to an embodiment of the present disclosure.

FIG. 2 is a flowchart illustrating a flow of action pattern model creation processing according to an embodiment of the present disclosure. The flowchart illustrated in FIG. 2 starts at predetermined timing such as when the vehicle data stored in the database included in the database server 4 is updated or when a performance command for the action pattern model creation processing is input to the data processing server 5, and then the action pattern model creation processing proceeds to processing of step S1.

In the processing of step S1, the data processing server 5 acquires the vehicle data stored in the database included in the database server 4 via the electric communication line 7. Thus, the processing of step S1 is completed, and the action pattern model creation processing proceeds to processing of step S2.

Figure 3:
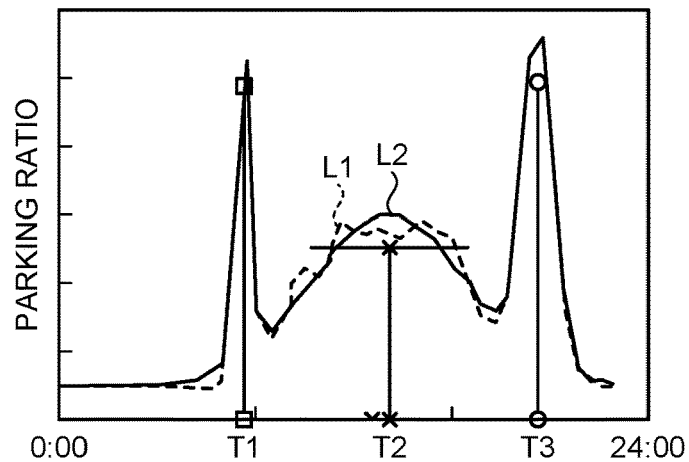
FIG. 3 is a diagram illustrating an example of a time variation of the average value of the parking ratio.

In the processing of step S2, the data processing server 5 calculates, for each vehicle 2, the time variation of the average value of parking ratios (in a state where the ignition switch is off) of the vehicle 2 for each day of the week and each parking place (home, office, etc.) using the vehicle data acquired in the processing of step S1. Specifically, the data processing server 5 classifies pieces of information that enable determination of the on/off state of the ignition switch into each day of the week and each parking place based on the acquisition date and time of vehicle data and the position information of the vehicle 2. Then, the data processing server 5 calculates the time variation (for example, for each day as a unit) of the average value of the parking ratios of the vehicle 2 for each day of the week and each parking place by using the classified pieces of information. By this processing, for example, a curve L1 indicating the average value of the parking ratios of the vehicle 2 at each time of one day as illustrated in FIG. 3 can be calculated for each day of the week and each parking place. In a case where the action schedule data of the vehicles 2 can be used, the data processing server 5 may calculate the time variation of the difference value between the planned value of the parking ratio included in the action schedule data and the actual value and use the time variation of the difference value for processing to be described below. Thus, the processing of step S2 is completed, and the action pattern model creation processing proceeds to processing of step S3.

In the processing of step S3, the data processing server 5 approximates the curve indicating the time variation of the average value of the parking ratios of the vehicle 2 calculated by the processing of step S2 using feature amounts. Specifically, as illustrated in FIG. 3, the data processing server 5 uses well-known methods such as the least squares method and the maximum likelihood estimation method to calculate an approximate curve L2 that approximates to the curve L1 indicating the time variation of the average value of the parking ratios. Then, the data processing server 5 calculates the representative peak time, the variance value, and the average value of the parking ratios included in the approximate curve L2 as the feature amounts. For example, in the example illustrated in FIG. 3, the data processing server 5 calculates the variance value of the three peaks appearing at times T1, T2, and T3 and the average value of the parking ratios as the feature amounts. Thus, the processing of step S3 is completed, and the action pattern model creation processing proceeds to processing of step S4.

In the processing of step S4, the data processing server 5 uses a general method such as Kmeans to cluster the vehicles 2, from which vehicle data is acquired, into a plurality of vehicle groups each including the vehicles 2 having similar feature amounts based on the feature amounts acquired by the processing of step S4. According to the processing, a plurality of vehicle groups each including vehicles having similar feature amounts can be formed. Thus, the processing of step S4 is completed, and the action pattern model creation processing proceeds to processing of step S5.

In the processing of step S5, the data processing server 5 groups the vehicles into a plurality of vehicle groups according to a predetermined rule such as merging one vehicle group with another vehicle group generated in the processing of step S4, and generates vehicle group information indicating a list of identification numbers of the vehicles 2 included is generated for each vehicle group. Thus, the processing of step S5 is completed, and the action pattern model creation processing proceeds to processing of step S6.

In the processing of step S6, the data processing server 5 acquires the feature amounts acquired for each of the vehicles 2 included in the vehicle group referring to the vehicle group information generated in the processing of step S5. Then, the data processing server 5 generates, for a vehicle group, a statistical model (action pattern model) for calculating the parking ratios of the vehicle 2 at a specified time for each day of the week and each parking place from the feature amounts of each vehicle 2 acquired by using a well-known statistical method. This statistical model is a mathematical model for estimating the action pattern of the vehicle 2 having time, day of the week, and a parking place as input variables and a parking ratio of vehicle 2 as an output variable, and the format of the mathematical formula is not particularly limited. Thus, the processing of step S6 is completed, and the action pattern model generation processing proceeds to processing of step S7.

In the processing of step S7, the data processing server 5 calculates, for each vehicle group, the time variation of the parking ratios of the vehicles 2 and the time variation of the number of parked vehicles for each day of the week and each parking place using the statistical model generated in the processing of step S6. Thus, the processing of step S7 is completed, and the action pattern model generation processing proceeds to processing of step S8.

Figure 4A:
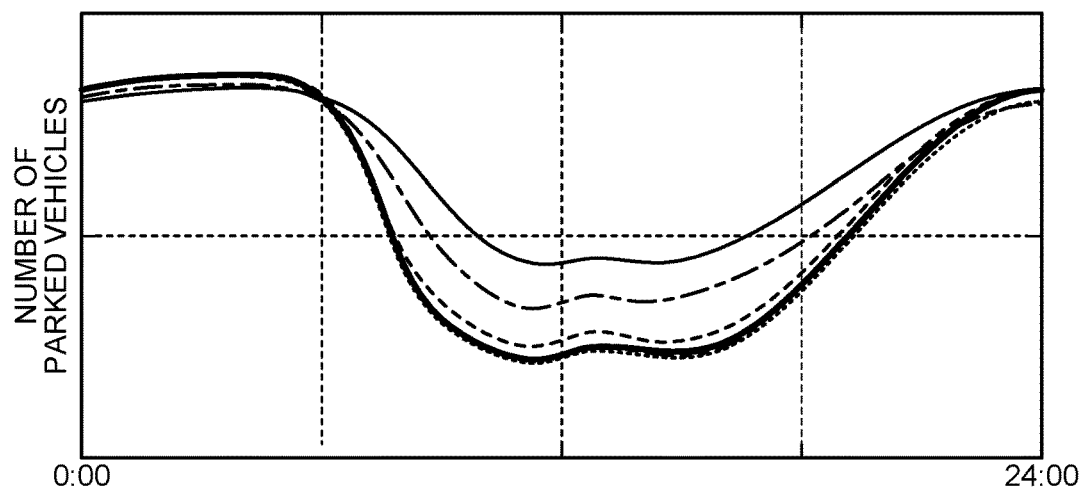
FIG. 4A is a diagram illustrating an example of a time variation of the average value of the number of parking spaces for each home.
Figure 4B:
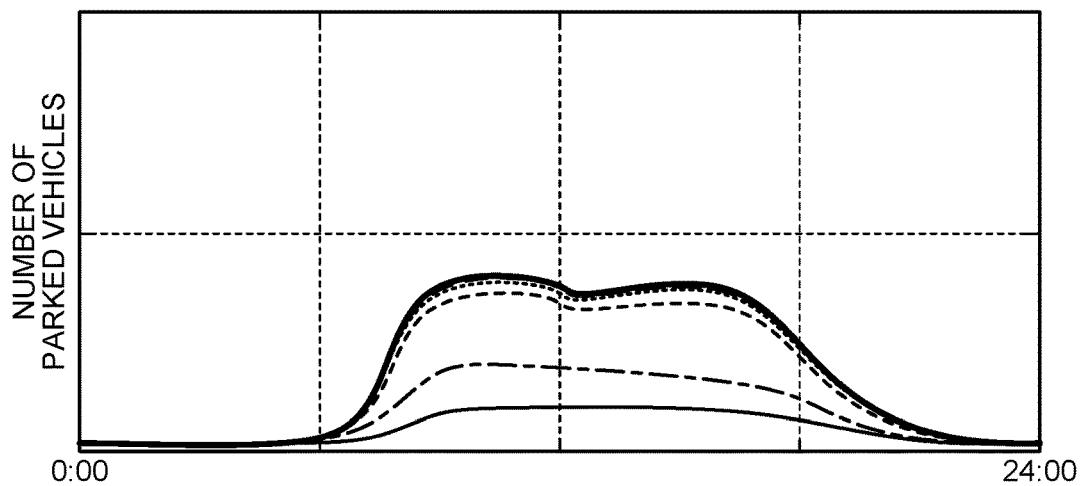
FIG. 4B is a diagram illustrating an example of a time variation of the average value of the number of parking spaces for each work place.
Figure 5A:
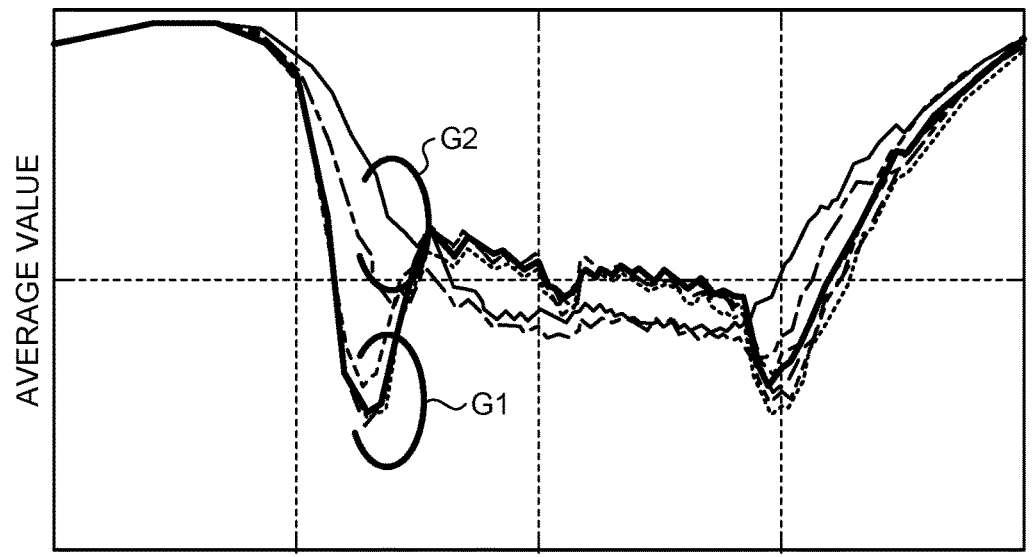
FIG. 5A is diagrams illustrating an example of a time variation of the average value of the parking ratio for each of weekday and holiday.
Figure 5B:
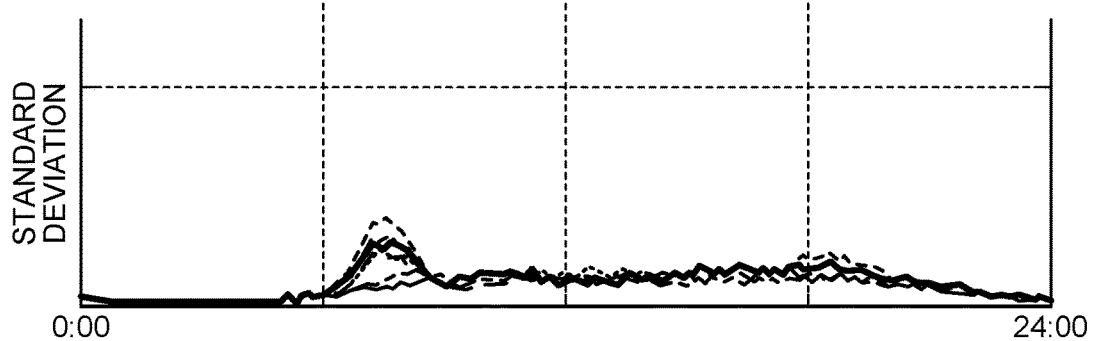
FIG. 5B is diagrams illustrating an example of a time variation of the standard deviation of the parking ratio for each of weekday and holiday.

In the processing of step S8, the data processing server 5 calculates, for each vehicle group, the time variation of the average value and the variance value (or standard deviation value) of the parking ratios of the vehicles 2 and the numbers of parked vehicles for each day of the week and each parking place using the time variation of the parking ratios of the vehicles 2 and the numbers of parked vehicles for each day the week and each parking place calculated by the processing of step S7. According to the processing, for example, the time variation of the average value of the numbers of parked vehicles for each of home and the work place as illustrated in FIGS. 4A and 4B, respectively, and the time variation of the average value and standard deviation of the parking ratios for each of weekday (curve group G1) and holiday (curve group G2) can be calculated for each vehicle group as illustrated in FIGS. 5A and 5B, respectively. Thus, the processing of step S8 is completed, and the action pattern model generation processing proceeds to processing of step S9.

In the processing of step S9, the data processing server 5 creates, for each vehicle group, a parking pattern map indicating the time variation of the average value and the variance value (or standard deviation value) of the parking ratios of the vehicles 2 and the numbers of parked vehicles for each day of the week and each parking place calculated by the processing of step S8, and stores the created parking pattern map. Thus, the processing of step S9 is completed, and the series of action pattern model generation processing ends.

Charge/discharge Control Processing

FIG. 6 is a flowchart illustrating a flow of charge/discharge control processing according to an embodiment of the present disclosure. The flowchart illustrated in FIG. 6 starts at a predetermined timing such as when creating a charge/discharge plan for the battery of the vehicles 2, and the charge/discharge control processing proceeds to the processing of step S11.

In the processing of step S11, the control server 6 acquires the parking pattern map for each vehicle group from the data processing server 5 via the electric communication line. The control server 6 may acquire a parking pattern map from the data processing server 5 in advance and read the acquired parking pattern map. Thus, the processing of step S11 is completed, and the charge/discharge control processing proceeds to processing of step S12.

In the processing of step S12, the control server 6 estimates, for each vehicle group, the ratio or the number of vehicles that can participate in the virtual power plant 1 at each time within a planning period during which a charge/discharge plan for the battery of the vehicles 2 is created based on the parking pattern map acquired in the processing of step S11. Specifically, the control server 6 calculates, for each vehicle group, the parking ratio and the number of parked vehicles 2 at specified time as the ratio or the number of vehicles that can participate in the virtual power plant 1 from the average value and the variance value of the parking ratios of the vehicles and the numbers of parked vehicles at each of times defined in the parking pattern map. Thus, the processing of step S12 is completed, and the charge/discharge control processing proceeds to processing of step S13.

In the processing of step S13, the control server 6 acquires the power supply/demand plan information in the power transmission and distribution network from the electric power company 3. Then, the control server 6 solves the mathematical programming problem to create a battery charge/discharge plan for the vehicles 2 to adjust the balance between supply and demand of electric power in the transmission and distribution network based on the acquired supply/demand plan information and based on the ratio or the number of vehicles that can participate in the virtual power plant 1 estimated for each vehicle group in step S12. Specifically, at a time when the power demand is higher than the supply, the control server 6 determines a vehicle group that discharges the power of the batteries to the transmission and distribution network based on the ratio or the number of vehicles that can participate in the virtual power plant 1. On the other hand, at a time when the power demand is lower than the supply, the control server 6 determines a vehicle group that charges the batteries based on the ratio or the number of vehicles that can participate in the virtual power plant 1. According to the processing described above, the generation amount of $CO_2$ can be reduced, and a fuel cost, an equipment cost, and social costs such as a carbon tax can be also reduced by effectively utilizing the electric power of the batteries mounted on the vehicles 2 to reduce the usage amount of fossil fuel in the power company. Thus, the processing of step S13 is completed, and the charge/discharge control processing proceeds to processing of step S14.

In the processing of step S14, the control server 6 controls the charging and discharging operations of the batteries of the vehicles 2 based on the charge/discharge plan created in the processing of step S13. Thus, the processing of step S14 is completed, and the series of charge/discharge control processing is completed.

As is clear from the above description, in the virtual power plant 1 according to the embodiment of the present disclosure, the control server 6 estimates, based on the past action patterns of the vehicles 2, the possibilities of participation of the vehicles 2 in the virtual power plant 1 when a charging and discharging operation is requested, and based on the estimation result, controls the charging and discharging operations of the batteries mounted on the vehicles 2. Thus, it is possible to appropriately control the charging and discharging operations of all vehicle groups included in the virtual power plant 1 according to the states of the vehicles 2.

The control device of the virtual power plant according to the present disclosure controls the charging and discharging operations of the storage batteries mounted on the vehicles in consideration of the possibilities of participation of the vehicles in the virtual power plant when a charging and discharging operation is requested, so that the control device can appropriately control the charging and discharging operations of all vehicle groups included in the virtual power plant according to the states of the vehicles.

According to an embodiment, a control device for a virtual power plant controls the charging and discharging operations of storage batteries mounted on vehicles in consideration of the possibilities of participation of the vehicles in the virtual power plant when a charging and discharging operation is requested, so that the control device for a virtual power plant can appropriately control the charging and discharging operations of all of vehicle groups included in the power plant according to the states of the vehicles.

According to an embodiment, the charging and discharging operations of all of vehicle groups included in the virtual power plant can be accurately controlled according to the states of the vehicles.

According to an embodiment, the charging and discharging operations of all of vehicle groups included in the virtual power plant can be accurately controlled according to the states of the vehicles.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for a virtual power plant that adjusts balance between supply and demand of electric power in a transmission and distribution network by controlling charging and discharging operations of storage batteries mounted on vehicles, the control device comprising:
    an estimation unit configured to estimate, based on past action patterns of the vehicles, possibilities of participation of the vehicles in the virtual power plant when a charging and discharging operation is requested; and
    a control unit configured to control the charging and discharging operations of the storage batteries mounted on the vehicles based on an estimation result of the estimation unit, wherein
    the estimation unit estimates parking ratios of the vehicles when the charging and discharging operation is requested, and estimates possibilities of participation of the vehicles in the virtual power plant based on the estimated parking ratios, and
    the estimation unit estimates, for each of a plurality of vehicle groups, a possibility of participation in the virtual power plant when the charging and discharging operation is requested, in which each of the plurality of vehicle groups includes vehicles having similar feature amounts based on the feature amounts acquired by approximating a curve indicating a time variation of an average value of the parking ratios.

2. The control device for the virtual power plant according to claim 1, wherein the estimation unit estimates, based on the parking ratios, the number of vehicles capable of performing the charging and discharging operation when the charging and discharging operation is requested.

3. The control device for the virtual power plant according to claim 1, wherein the acquired feature amounts include a peak time, a variance value of the peak time, and the average value of the parking ratios in the approximated curve, and each of the plurality of vehicle groups includes the vehicles having the similar feature amounts.

* * * * *